United States Patent
Lee

(10) Patent No.: US 10,542,474 B2
(45) Date of Patent: Jan. 21, 2020

(54) METHOD OF HANDLING NETWORK ENTRY IN A CELL CLUSTER AND RELATED COMMUNICATION DEVICE

(71) Applicant: Industrial Technology Research Institute, Hsinchu (TW)

(72) Inventor: Chien-Min Lee, New Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 14/166,816

(22) Filed: Jan. 28, 2014

(65) Prior Publication Data

US 2014/0211758 A1  Jul. 31, 2014

Related U.S. Application Data

(60) Provisional application No. 61/758,777, filed on Jan. 31, 2013.

(51) Int. Cl.
| | | |
|---|---|---|
| *H04W 36/04* | (2009.01) | |
| *H04W 36/24* | (2009.01) | |
| *H04W 52/40* | (2009.01) | |
| *H04W 48/12* | (2009.01) | |
| *H04W 52/32* | (2009.01) | |
| *H04W 52/50* | (2009.01) | |

(52) U.S. Cl.
CPC ......... *H04W 36/24* (2013.01); *H04W 48/12* (2013.01); *H04W 52/325* (2013.01); *H04W 52/40* (2013.01); *H04W 52/50* (2013.01)

(58) Field of Classification Search
None
See application file for complete search history.

(56) References Cited

U.S. PATENT DOCUMENTS

| | | | |
|---|---|---|---|
| 2009/0270103 A1 | 10/2009 | Pani | |
| 2009/0325626 A1* | 12/2009 | Palanki | H04L 5/0007 455/522 |
| 2010/0034163 A1* | 2/2010 | Dannnjanovic | H04W 72/0453 370/329 |
| 2010/0130218 A1 | 5/2010 | Zhang | |
| 2010/0227569 A1* | 9/2010 | Bala | H04L 5/0007 455/73 |
| 2010/0265914 A1 | 10/2010 | Song | |

(Continued)

FOREIGN PATENT DOCUMENTS

| | | |
|---|---|---|
| CN | 101682877 A | 3/2010 |
| CN | 102017702 A | 4/2011 |

(Continued)

*Primary Examiner* — Anh Vu H Ly
*Assistant Examiner* — Hector Reyes
(74) *Attorney, Agent, or Firm* — Winston Hsu

(57) ABSTRACT

A method of handling handovers in a cell cluster comprises transmitting, by an anchor cell in the cell cluster, first control information with a first power level to a communication device of the wireless communication system, for the communication device to perform a network entry according to the first control information; and transmitting, by the anchor cell, second control information with a second power level lower than the first power level to the communication device, for the communication device to obtain channel information according to the second control information.

3 Claims, 8 Drawing Sheets

(56) References Cited

U.S. PATENT DOCUMENTS

| | | | | |
|---|---|---|---|---|
| 2010/0272017 A1* | 10/2010 | Terry | .................... | H04W 48/12 370/328 |
| 2011/0235743 A1* | 9/2011 | Lee | ....................... | H04L 5/0048 375/295 |
| 2012/0320874 A1 | 12/2012 | Li et al. | | |
| 2013/0114557 A1* | 5/2013 | Kim | ....................... | H04L 5/0053 370/329 |
| 2014/0036804 A1* | 2/2014 | Chen | ................. | H04W 72/0406 370/329 |
| 2014/0171091 A1* | 6/2014 | Cai | ....................... | H04W 76/15 455/450 |
| 2017/0181145 A1* | 6/2017 | Fong | ....................... | H04L 5/001 |

FOREIGN PATENT DOCUMENTS

| | | |
|---|---|---|
| CN | 102076031 A | 5/2011 |
| CN | 102119567 A | 7/2011 |
| CN | 102187725 A | 9/2011 |
| CN | 102197678 A | 9/2011 |
| CN | 102823168 A | 12/2012 |
| EP | 2 367 379 A2 | 9/2011 |
| EP | 2 367 379 A3 | 11/2011 |
| WO | 0120942 A1 | 3/2001 |
| WO | 2010/099105 A1 | 9/2010 |
| WO | 2012067367 A2 | 5/2012 |
| WO | 2012067367 A3 | 5/2012 |
| WO | 2013002474 A1 | 1/2013 |

* cited by examiner

METHOD OF HANDLING NETWORK ENTRY IN A CELL CLUSTER AND RELATED COMMUNICATION DEVICE

CROSS REFERENCE TO RELATED APPLICATIONS

This application claims the benefit of U.S. Provisional Application No. 61/758,777, filed on Jan. 31, 2013 and entitled "Coverage enhancements for a cell cluster", the contents of which are incorporated herein in their entirety.

BACKGROUND OF THE INVENTION

1. Field of the Invention

The present invention relates to a method used in a wireless communication system and related communication device, and more particularly, to a method of handling a network entry in a cell cluster and related communication device.

2. Description of the Prior Art

A long-term evolution (LTE) system supporting the 3rd Generation Partnership Project (3GPP) Rel-8 standard and/or the 3GPP Rel-9 standard are developed by the 3GPP as a successor of a universal mobile telecommunications system (UMTS), for further enhancing performance of the UMTS to satisfy increasing needs of users. The LTE system includes a new radio interface and a new radio network architecture that provides a high data rate, low latency, packet optimization, and improved system capacity and coverage. In the LTE system, a radio access network known as an evolved universal terrestrial radio access network (E-UTRAN) includes multiple evolved Node-Bs (eNBs) for communicating with multiple user equipments (UEs), and for communicating with a core network including a mobility management entity (MME), a serving gateway, etc., for Non-Access Stratum (NAS) control.

A LTE-advanced (LTE-A) system, as its name implies, is an evolution of the LTE system. The LTE-A system targets faster switching between power states, improves performance at the coverage edge of an eNB, and includes advanced techniques, such as carrier aggregation (CA), coordinated multipoint (CoMP) transmission/reception, uplink (UL) multiple-input multiple-output (MIMO), etc. For a UE and an eNB to communicate with each other in the LTE-A system, the UE and the eNB must support standards developed for the LTE-A system, such as the 3GPP Rel-10 standard or later versions.

In addition, multiple cells (e.g., femto cells, pico cells) may be grouped into a cell cluster to improve quality of transmissions and/or receptions occurred in a coverage area of the cell cluster. However, a coverage area of a clustered cell is usually smaller than a coverage area of a macro cell. For example, a diameter of the coverage area of the clustered cell may be 50 m~100 m. The UE may move across boundaries of the clustered cells, even if the UE moves with a moderate speed. Accordingly, the UE may need to perform handovers frequently, and performance improvement obtained from the cell cluster is decreased due to the frequent handovers.

Thus, how to reduce a number of the handovers performed by the UE is an important problem to be solved.

SUMMARY OF THE INVENTION

The present invention therefore provides a method and related communication device for a network entry in a cell cluster to solve the abovementioned problem.

A method of handling a network entry in a cell cluster comprises transmitting, by an anchor cell in the cell cluster, first control information with a first power level to a communication device of the wireless communication system, for the communication device to perform a network entry according to the first control information; and transmitting, by the anchor cell, second control information with a second power level lower than the first power level to the communication device, for the communication device to obtain channel information according to the second control information.

A method of handling a network entry for a communication device in a wireless communication system comprises the steps of receiving system information transmitted by a cell in a cell cluster of the wireless communication system, after camping on the cell; determining whether the cell is an anchor cell in the cell cluster according to information of the anchor cell comprised in the system information; continue to camp on the cell, if the cell is the anchor cell; and camping on the anchor cell according to the information of the anchor cell, if the cell is not the anchor cell.

A method of handling a handover for a communication device in a wireless communication system comprises the steps of camping on a first cell in a first cell cluster; stopping performing a handover, when moving from a coverage area of the first cell to a coverage area of a second cell in the first cell cluster; and performing the handover, when moving from the coverage area of the first cell to a coverage area of a third cell in a second cell cluster.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
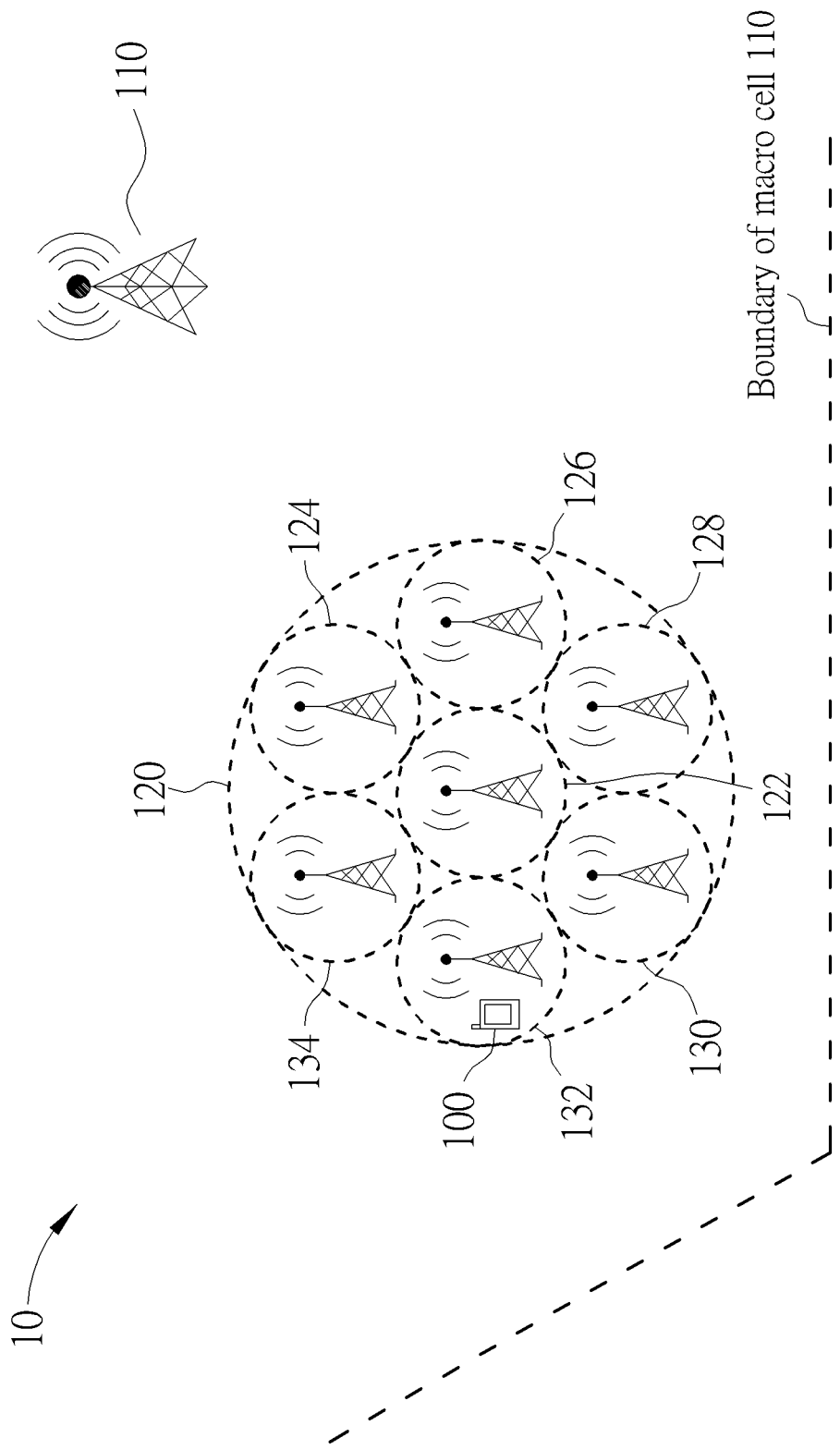
FIG. 1 is a schematic diagram of a wireless communication system according to an example of the present invention.

FIG. 1 is a schematic diagram of a wireless communication system 10 according to an example of the present invention. The wireless communication system 10 is briefly composed of a communication device 100, a macro cell 110 and a cell cluster 120. The cell cluster 120 includes 7 clustered cells (hereinafter cells for short) 122-134, wherein the cell 122 is an anchor cell and the cells 124-134 are non-anchor cells. Boundaries of the cells are denoted by respective doted circles, and coverage areas of the cells are areas within the boundaries, respectively. The coverage areas of the cells 122-134 may be non-overlapped or partly overlapped, and are not limited to the non-overlapped coverage areas shown in FIG. 1. Note that the cell cluster 120 is within a coverage area of the macro cell 110 in the present example. However, this is not a restriction for realizing the present invention, and the cell cluster 120 may not be within a coverage area of any macro cell in another example.

Furthermore, carrier frequencies operated by the macro cell 110 and the cell cluster 120 may be the same or different. For example, the communication device 100 may communicate with the macro cell 110 and the cell cluster 120 according to a carrier aggregation (CA), when the carrier frequencies operated by the macro cell 110 and the cell cluster 120 are different. Note that it means that the communication device 100 communicate with one or more of the cells 122-134, when a statement such as the communication device 100 communicates with the cell cluster 120 is used. In addition, the carrier frequencies operated by the cells 124-134 may also be the same or different. That is, the CA may even be supported, when the UE communicates with two or more of the cells 124-134 which operate at different carrier frequencies.

In FIG. 1, the communication device 100, the macro cell 110 and the cell cluster 120 are simply utilized for illustrating the structure of the wireless communication system 10. Practically, a cell (e.g., the macro cell 110 or a clustered cell) can be controlled (e.g., generated) by a Node-B (NB) in a universal mobile telecommunications system (UMTS). In another example, a cell (e.g., the macro cell 110 or a clustered cell) can be controlled (e.g., generated) by an evolved NB (eNB) and/or a relay in a long term evolution (LTE) system, a LTE-Advanced (LTE-A) system or an evolution of the LTE-A system. That is, each of the cells 122-134 may be controlled by a respective NB/eNB. In addition, a NB (or an eNB) may control multiple cells according to design of the wireless communication system 10. For example, the cells 124 and 126 may be controlled by the same NB (or the same eNB). The communication device 100 can be a user equipment (UE), a low cost device (e.g., machine type communication (MTC) device), a mobile phone, a laptop, a tablet computer, an electronic book or a portable computer system. In addition, a cell and the communication device 100 can be seen as a transmitter or a receiver according to direction, e.g., for an uplink (UL), the communication device 100 is the transmitter and the cell is the receiver, and for a downlink (DL), the cell is the transmitter and the communication device 100 is the receiver.

Furthermore, information may be processed only by the anchor cell (i.e., the cell 122) and decisions corresponding to the information are made at the anchor cell, after the anchor cell receives the information transmitted by the communication device 100. In another example, the information can be processed by both the anchor cell and other cells (e.g., the macro cell 110 and/or other clustered cell(s)), and the decisions are made after coordination and/or cooperation are performed by the anchor cell and the other cells.

Figure 2:
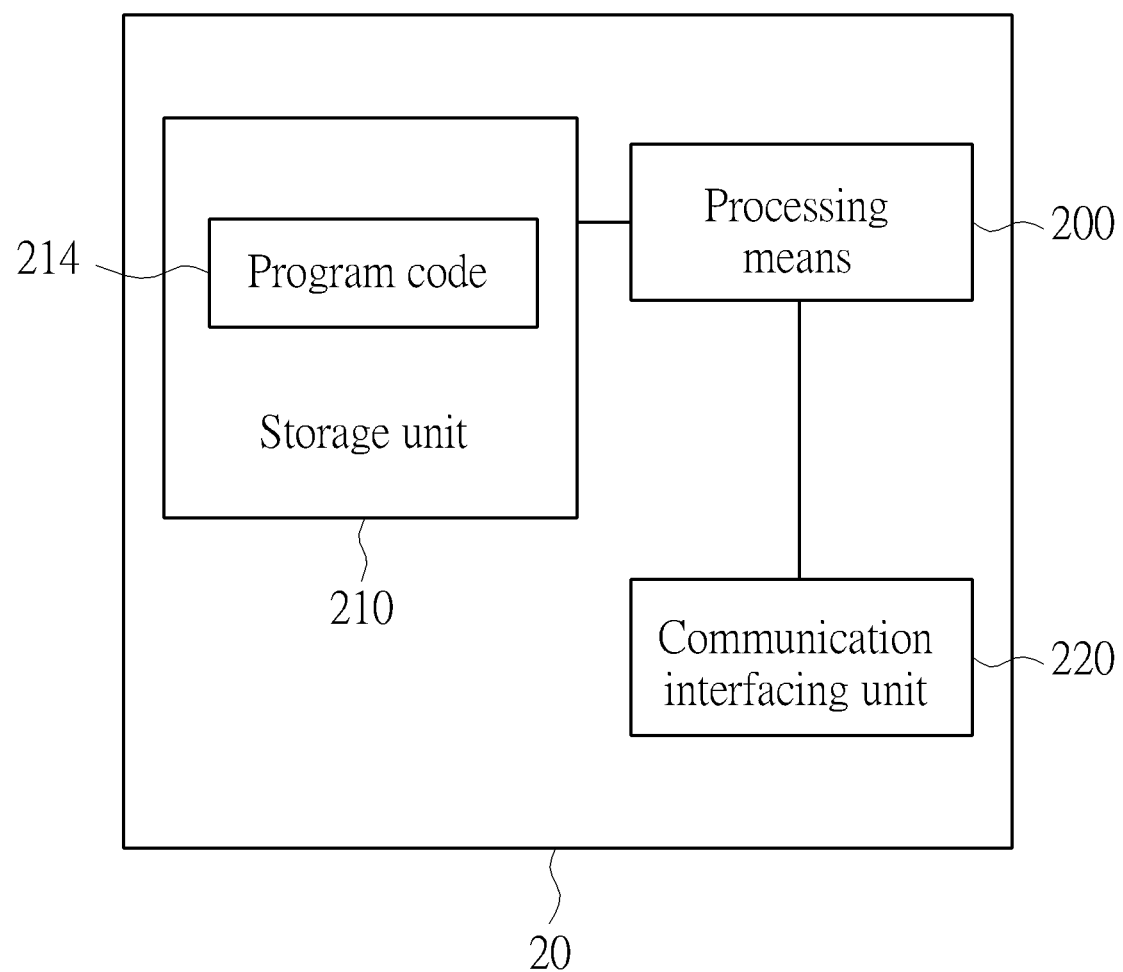
FIG. 2 is a schematic diagram of a communication device according to an example of the present invention.

Please refer to FIG. 2, which is a schematic diagram of a communication device 20 according to an example of the present invention. The communication device 20 can be used for realizing the communication device 100 and/or a NB, an eNB or a relay generating a cell shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that can store a program code 214, accessed and executed by the processing means 200. Examples of the storage unit 210 include but are not limited to a subscriber identity module (SIM), read-only memory (ROM), flash memory, random-access memory (RAM), CD-ROM/DVD-ROM, magnetic tape, hard disk and optical data storage device. The communication interfacing unit 220 is preferably a transceiver and is used to transmit and receive signals (e.g., messages or packets) according to processing results of the processing means 200.

Figure 3:
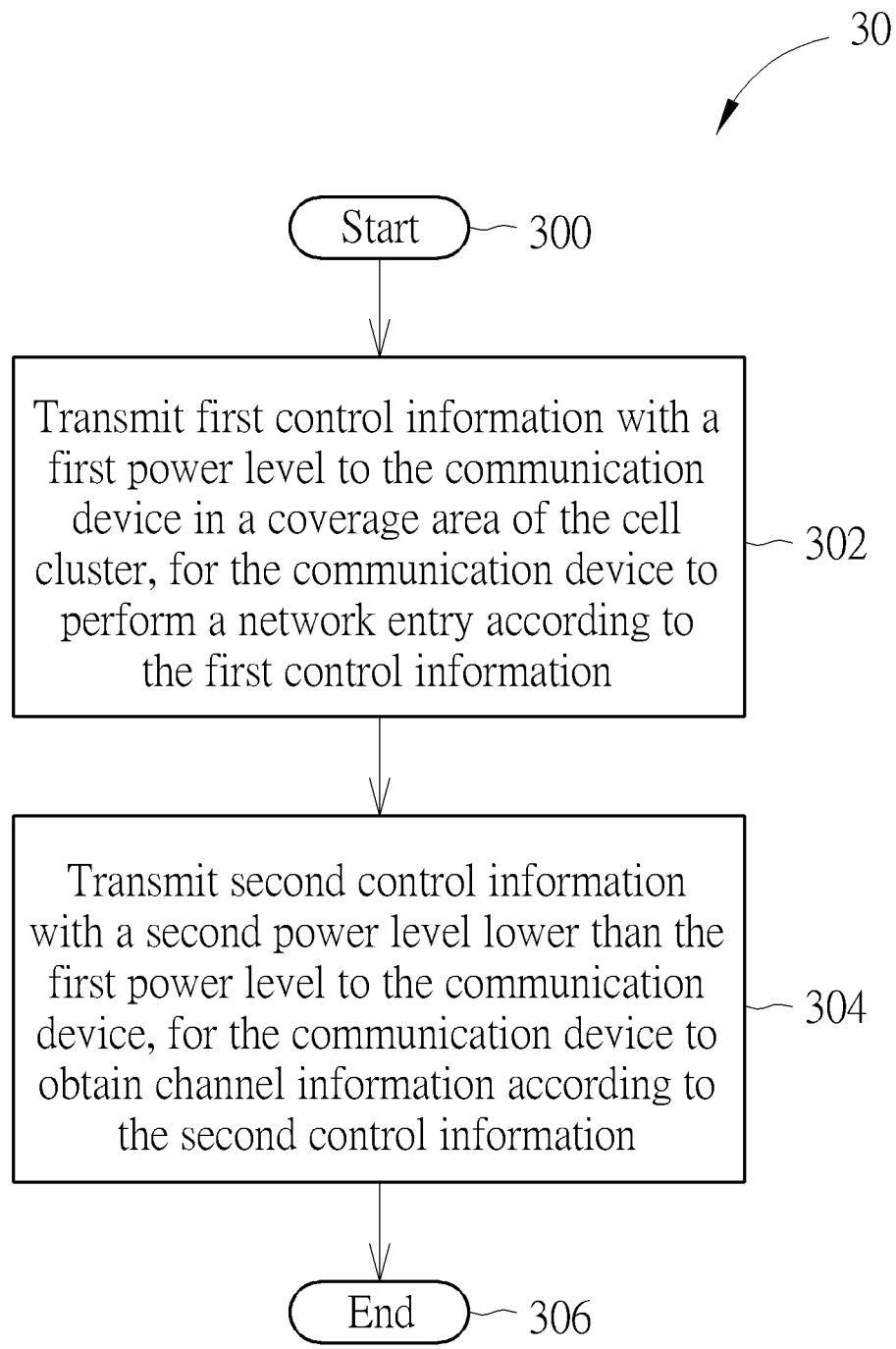
FIG. 3 is a flowchart of a process according to an example of the present invention.

Please refer to FIG. 3, which is a flowchart of a process 30 according to an example of the present invention. The process 30 can be utilized in the anchor cell (i.e., utilized in a NB, an eNB or a relay which controls the anchor cell) shown in FIG. 1, for handling a network entry in the cell cluster 120. The process 30 may be compiled into the program code 214 and includes the following steps:

Step 300: Start.

Step 302: Transmit first control information with a first power level to the communication device in a coverage area of the cell cluster, for the communication device to perform a network entry according to the first control information.

Step 304: Transmit second control information with a second power level lower than the first power level to the communication device, for the communication device to obtain channel information according to the second control information.

Step 306: End.

According to the process 30, the anchor cell transmits first control information with a first power level to the communication device 100 in a coverage area of the cell cluster 120, for the communication device 100 to perform a network entry according to the first control information. Note that the first control information may include only part of control information needed for performing the network entry, or may include all the control information needed for performing the network entry. The anchor cell transmits second control information with a second power level lower than the first power level to the communication device 100, for the communication device 100 to obtain channel information according to the second control information. In other words, the communication device 100 does not perform the network entry according to the first control information (which may be slightly different from the one transmitted by the anchor cell) transmitted by another cell (e.g., the cell 124) in the cell cluster 120, even when the communication device 100 is in a coverage area of the cell. That is, the communication device 100 camps on the anchor cell according to the first control information. This can be achieved by that the anchor cell transmits the first control information with the first power level larger than a power level (e.g., the second power level) used by other cells in the cell cluster 120 for transmitting the first control information.

Accordingly, a handover will not be triggered by a cell or the communication device 100, when the communication device 100 moves across a boundary between two cells (e.g., the cells 126 and 128) in the cell cluster 120. In other words, the communication device 100 does not need to perform the handover as long as the communication device 100 is in the coverage area of the cell cluster 120, even if the communication device 100 moves across multiple boundaries of the cells in the cell cluster 120. However, the communication device 100 may still need to perform a handover, when the communication device 100 moves across the coverage area of the cell cluster 120. Note that the coverage area of the cell cluster 120 can be approximately seen as a union of the coverage areas of the cells 122-134. In addition, as known by those skilled in the art, it means that an eNB/NB controlling a cell performs a transmission or a reception, when a statement such as the cell performs the transmission or the reception is used. As a result, performance improvement obtained from the cell cluster is not decreased due to frequent handovers.

Realization of the present invention is not limited to the above description.

For example, the first control information in the process 30 may include at least a primary synchronization signal (PSS), a secondary synchronization signal (SSS) and/or a common reference signal (CRS). In addition, the second control information in the process 30 may include at least a channel state information-reference signal (CSI-RS) and downlink control information (DCI). Note that a method according to which the anchor cell transmits the control information (e.g., the first control information and/or the second control information) is not limited. For example, the anchor cell may transmit the control information via a unicast, a multicast or a broad cast.

A difference between the first power level and the second power level in the process 30 is not limited. For example, the first power level should be large enough such that the communication device 100 does not perform any handover in a coverage area of the cell cluster 120. In other words, the first power level should be at least greater than any power level used by any cell in the cell cluster 120 for transmitting control information which may trigger a handover. The above descriptions are equivalent because the power level is closely related to the coverage area. Thus, the handover does not happen when the communication device 100 moves across a boundary between two cells in the cell cluster 120.

On the other hand, in addition to the first control information and the second control information in the process 30, the anchor cell may further transmit third control information with either one of the second power level and the first power level to the communication device 100, wherein the third control information may include system information (SI) and paging information.

The communication device 100 may transmit channel information to the anchor cell, after the communication device 100 obtains the channel information according to the second control information. Accordingly, the anchor cell may determine a cell (e.g., the cell 130) in the cell cluster 120 after receiving the channel information, for the communication device 100 to perform a communication operation (e.g., a transmission or a reception of a packet) with the cell. Note that the anchor cell may determine the cell by itself, or according to a result of coordination between the anchor cell and one or more cells in the cell cluster 120. Preferably, the determination of the cell is transparent to the communication device 100. That is, the communication device 100 considers that it performs the communication operation with the anchor cell, while it actually performs the communication operation with the determined cell. For example, the communication operation performed with the cell may include at least a non-contention based random access procedure, a reception of a physical downlink shared channel (PDSCH), a transmission of a physical uplink shared channel (PUSCH) and/or a transmission of a physical uplink control channel (PUCCH). On the other hand, the network entry in the process 30 may include at least a contention based random access procedure and/or a cell search procedure.

Figure 4:
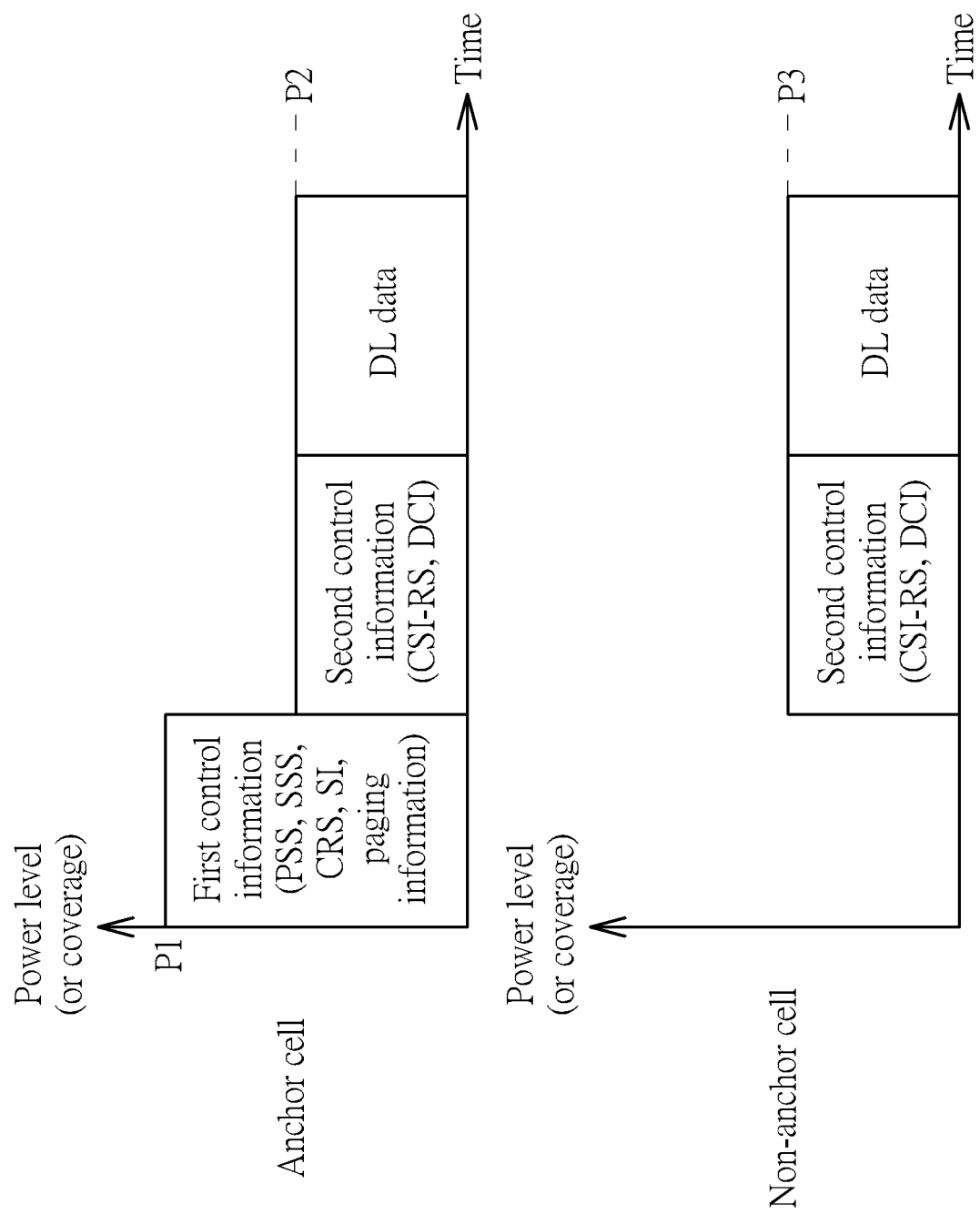
FIG. 4 is a schematic diagram of power level distributions according to an example of the present invention.

FIG. 4 is a schematic diagram of power level distributions according to an example of the present invention. As shown in FIG. 4, the anchor cell (e.g., the cell 122) may transmit first control information including a PSS, a SSS, a CRS, SI and paging information with a power level P1 to the communication device 100, e.g., by using a power boost. Then, the anchor cell may transmit second control information including a CSI-RS and DCI with a power level P2 lower than the power level P1 to the communication device 100. The communication device 100 may obtain channel information according to the second control information, and can transmit the channel information to the anchor cell. The anchor cell may determine a cell (e.g., the cell 128) for communicating with the communication device 100. Accordingly, the communication device 100 may start to receive DL data (e.g., physical DL shared channel (PDSCH)) from the network via the cell. At the same time, a non-anchor cell (e.g., the cell 132) may not transmit the first control information, and may transmit the second control information (which may be slightly different from the one transmitted by the anchor cell) with a power level P3 to the communication device 100. The power level P3 may be closed to (or the same as) the power level P2, but is lower than the power level P1. The communication device 100 may also use the second control information transmitted by the non-anchor cell to obtain the channel information.

Figure 5:
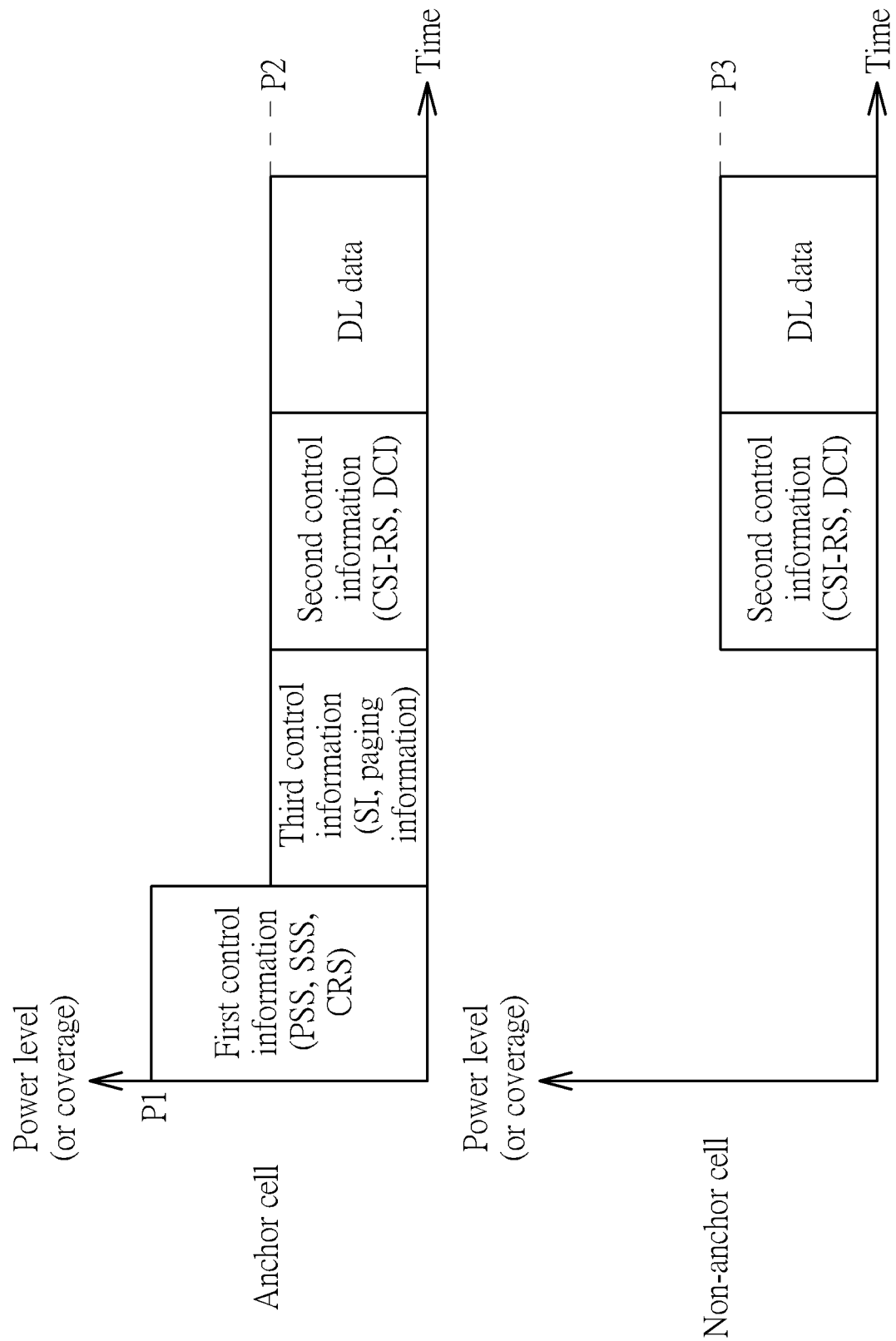
FIG. 5 is a schematic diagram of power level distributions according to an example of the present invention.

FIG. 5 is a schematic diagram of power level distributions according to an example of the present invention. As shown in FIG. 5, the anchor cell (e.g., the cell 122) may transmit first control information including a PSS, a SSS and a CRS with a power level P1 to the communication device 100, e.g., by using a power boost. Then, the anchor cell may transmit second control information including a CSI-RS and DCI with a power level P2 lower than the power level P1 to the communication device 100. Different from FIG. 4, the anchor cell may transmit third control information including SI and paging information with the power level P2 to the communication device 100. The reason is that the third control information may be encoded with a low rate code and/or a new coding scheme, and/or may be received by the communication device 100 with an advanced receiver. Thus, the third control information may be robust enough without using a large power level. The communication device 100 may obtain channel information according to the second control information, and can transmit the channel information to the anchor cell. The anchor cell may determine a cell (e.g., the cell 128) for communicating with the communication device 100. Accordingly, the communication device 100 may start to receive DL data (e.g., PDSCH) from the network via the cell. At the same time, a non-anchor cell (e.g., the cell 132) may operate according to the description related to FIG. 4, and is not narrated herein.

Figure 6:
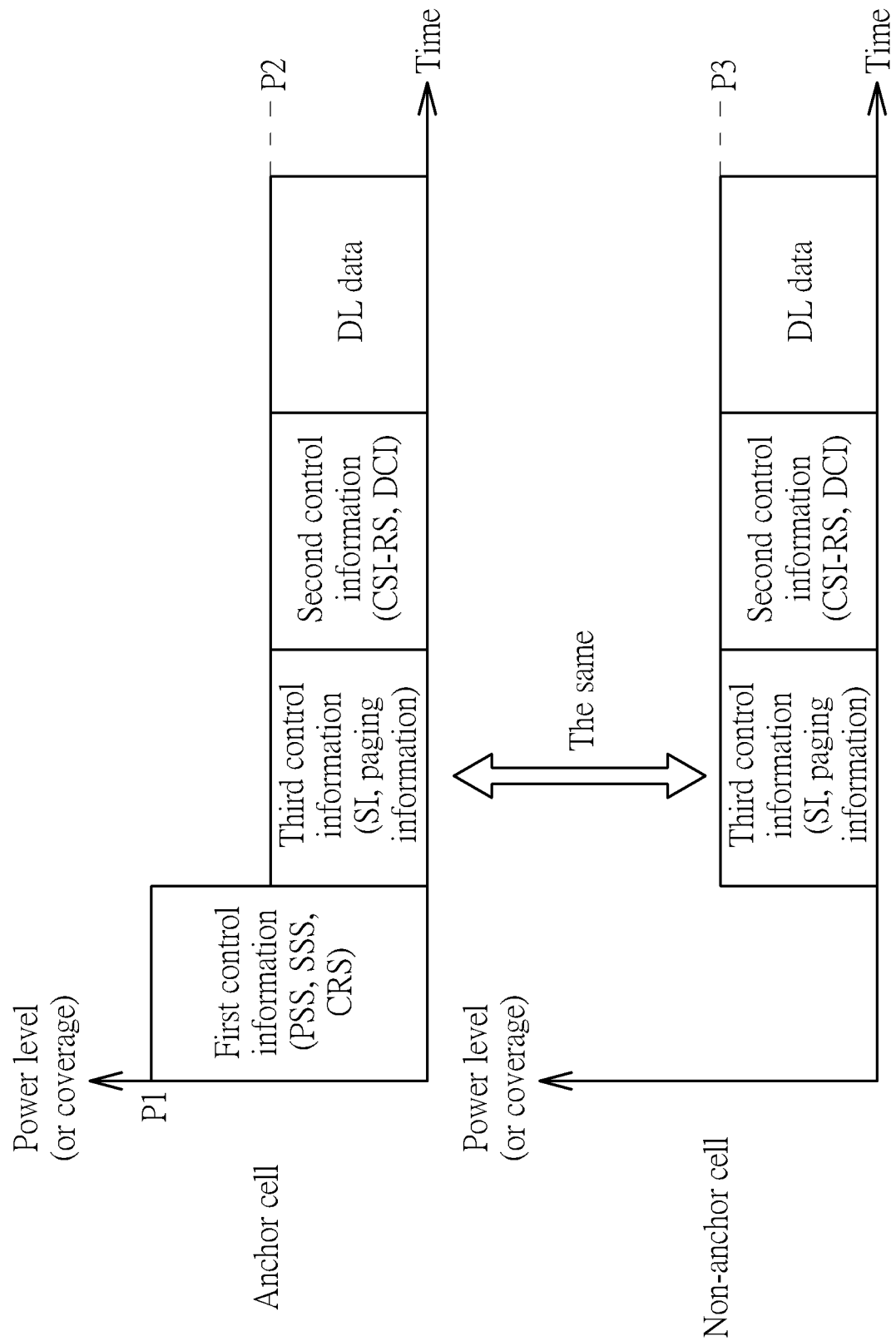
FIG. 6 is a schematic diagram of power level distributions according to an example of the present invention.

FIG. 6 is a schematic diagram of power level distributions according to an example of the present invention. As shown in FIG. 6, the anchor cell (e.g., the cell 122) may transmit first control information including a PSS, a SSS and a CRS with a power level P1 to the communication device 100, e.g., by using a power boost. Then, the anchor cell may transmit second control information including a CSI-RS and DCI with a power level P2 lower than the power level P1 to the communication device 100. Similar to FIG. 5, the anchor cell may transmit third control information including SI and paging information with the power level P2 to the communication device 100. The reason is that the third control information may be encoded with a low rate code and/or a new coding scheme, may be received by the communication device 100 with an advanced receiver, and/or may be transmitted jointly by a non-anchor cell. Thus, the third control information may be robust enough without using a large power level. The communication device 100 may obtain channel information according to the second control information, and can transmit the channel information to the anchor cell. The anchor cell may determine a cell (e.g., the cell 128) for communicating with the communication device 100. Accordingly, the communication device 100 may start to receive DL data (e.g., PDSCH) from the network via the cell. At the same time, a non-anchor cell (e.g., the cell 132) may not transmit the first control information, and may transmit the second control information (which may be slightly different from the one transmitted by the anchor cell) with a power level P3 to the communication device 100. Different from FIGS. 4 and 5, the non-anchor cell may further transmit the third control information to the communication device 100, to improve a reception of the third control information. The power level P3 may be closed to (or the same as) the power level P2, but is lower than the power level P1. The communication device 100 may also use the second control information transmitted by the non-anchor cell to obtain the channel information.

Figure 7:
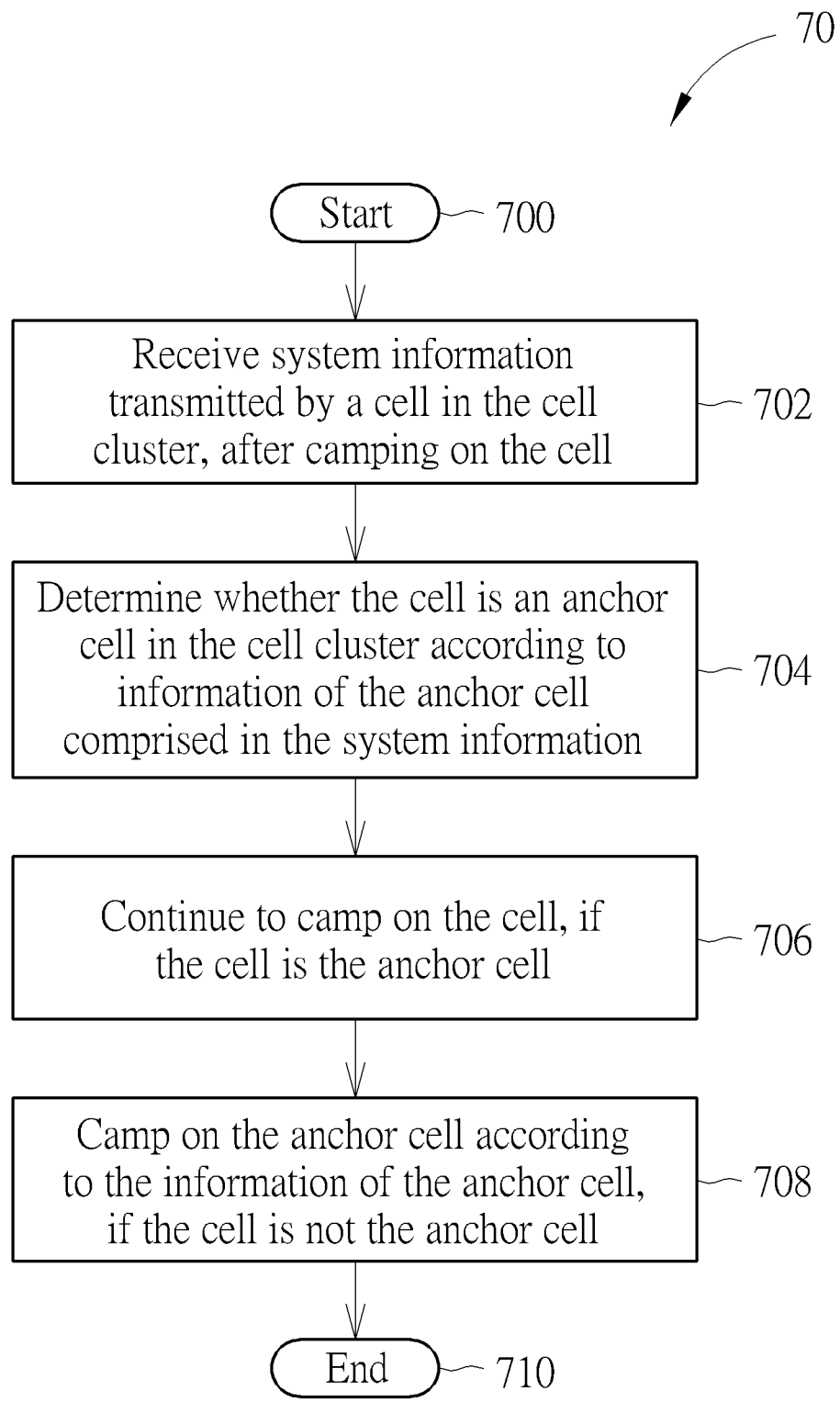
FIG. 7 is a flowchart of a process according to an example of the present invention.

Please refer to FIG. 7, which is a flowchart of a process 70 according to an example of the present invention. The process 70 can be utilized in the communication device 100 shown in FIG. 1, for handling a network entry. The process 70 may be compiled into the program code 214 and includes the following steps:

Step 700: Start.

Step 702: Receive system information transmitted by a cell in the cell cluster, after camping on the cell.

Step 704: Determine whether the cell is an anchor cell in the cell cluster according to information of the anchor cell comprised in the system information.

Step 706: Continue to camp on the cell, if the cell is the anchor cell.

Step 708: Camp on the anchor cell according to the information of the anchor cell, if the cell is not the anchor cell.

Step 710: End.

According to the process 70, the communication device 100 receives system information transmitted by a cell in the cell cluster 120, after camping on the cell. Then, the communication device 100 determines whether the cell is an anchor cell (e.g., the cell 122) in the cell cluster according to information of the anchor cell comprised in the system information. The communication device 100 continues to camp on the cell if the cell is the anchor cell, and camps on the anchor cell according to the information of the anchor cell if the cell is not the anchor cell. In other words, the communication device 100 tries to (or changes to) camp on the anchor cell, even if the communication device 100 originally camped on a non-anchor cell (e.g., the cell 124) in the cell cluster 120.

Accordingly, a handover will not be triggered by a cell or the communication device 100, when the communication device 100 moves across a boundary between two cells (e.g., the cells 126 and 128) in the cell cluster 120. In other words, the communication device 100 does not need to perform the handover as long as the communication device 100 is in a coverage area of the cell cluster 120, even if the communication device 100 moves across multiple boundaries of the cells in the cell cluster 120. However, the communication device 100 may still need to perform a handover, when the communication device 100 moves across the coverage area of the cell cluster 120. Note that the coverage area of the cell cluster 120 can be approximately seen as a union of the coverage areas of the cells 122-134. In addition, as known by those skilled in the art, it means that an eNB/NB controlling a cell performs a transmission or a reception, when a statement such as the cell performs the transmission or the reception is used. As a result, performance improvement obtained from the cell cluster is not decreased due to frequent handovers.

Realization of the present invention is not limited to the above description.

For example, the information of the anchor cell in the process 70 may include at least an identification (e.g., cell ID) of the anchor cell. Thus, the communication device may determine whether the cell is the anchor cell comparing an identification of the cell with the identification of the anchor cell.

In addition, the communication device 100 may receive control information transmitted by one or more cells in the cell cluster 120 when performing a network entry, to camp on one of the cells according to the control information. Then, the communication device is able to perform step 702. The control information may include at least a PSS, a SSS and/or a CRS.

A method according to which a cell transmits the control information is not limited. For example, the cell may transmit the control information via a unicast, a multicast or a broad cast. In addition, the control information may be transmitted by the anchor cell and/or a non-anchor cell in the cell cluster 120. For example, similar to the first control information shown in FIG. 4, the control information may be transmitted with a large power level (e.g., the power level P1) by the anchor cell, e.g., by using a power boost. In another example, the control information may be transmitted with a normal power level by the anchor cell and by one or more non-anchor cells, e.g., without using a power boost.

The anchor cell may determine a cell (e.g., the cell 130) in the cell cluster 120, after the communication device 100 camps on the anchor cell and transmits channel information to the anchor cell. Accordingly, the communication device 100 may perform a communication operation (e.g., a transmission or a reception of a packet) with the cell. Note that the anchor cell may determine the cell by itself, or according to a result of coordination between the anchor cell and one or more cells in the cell cluster 120. Preferably, the determination of the cell is transparent to the communication device 100. That is, the communication device 100 considers that it performs the communication operation with the anchor cell, while it actually performs the communication operation with the determined cell. For example, the communication operation performed with the cell may include at least a non-contention based random access procedure, a reception of a physical downlink shared channel (PDSCH), a transmission of a physical uplink shared channel (PUSCH) and/or a transmission of a physical uplink control channel (PUCCH). On the other hand, the network entry mentioned above may include at least a contention based random access procedure and/or a cell search procedure.

According to the above description (e.g., related to the process 30 and/or the process 70), the communication device 100 camps on the anchor cell, even if the communication device 100 may perform transmissions or receptions via another cell in the cell cluster 120. In this situation, the communication device 100 synchronizes with the anchor cell but not with the cell. Synchronization mismatch occurred between the communication device 100 and the cell should be solved. For example, the cell should defer the transmissions or receptions, if a distance between the cell and the communication device 100 is smaller than a distance between the anchor cell and the communication device 100. In contrast, the cell should advance the transmissions or receptions, if the distance between the cell and the communication device 100 is larger than the distance between the anchor cell and the communication device 100. Thus, the communication device 100 can also synchronize with the cell, and the synchronization mismatch is solved.

Figure 8:
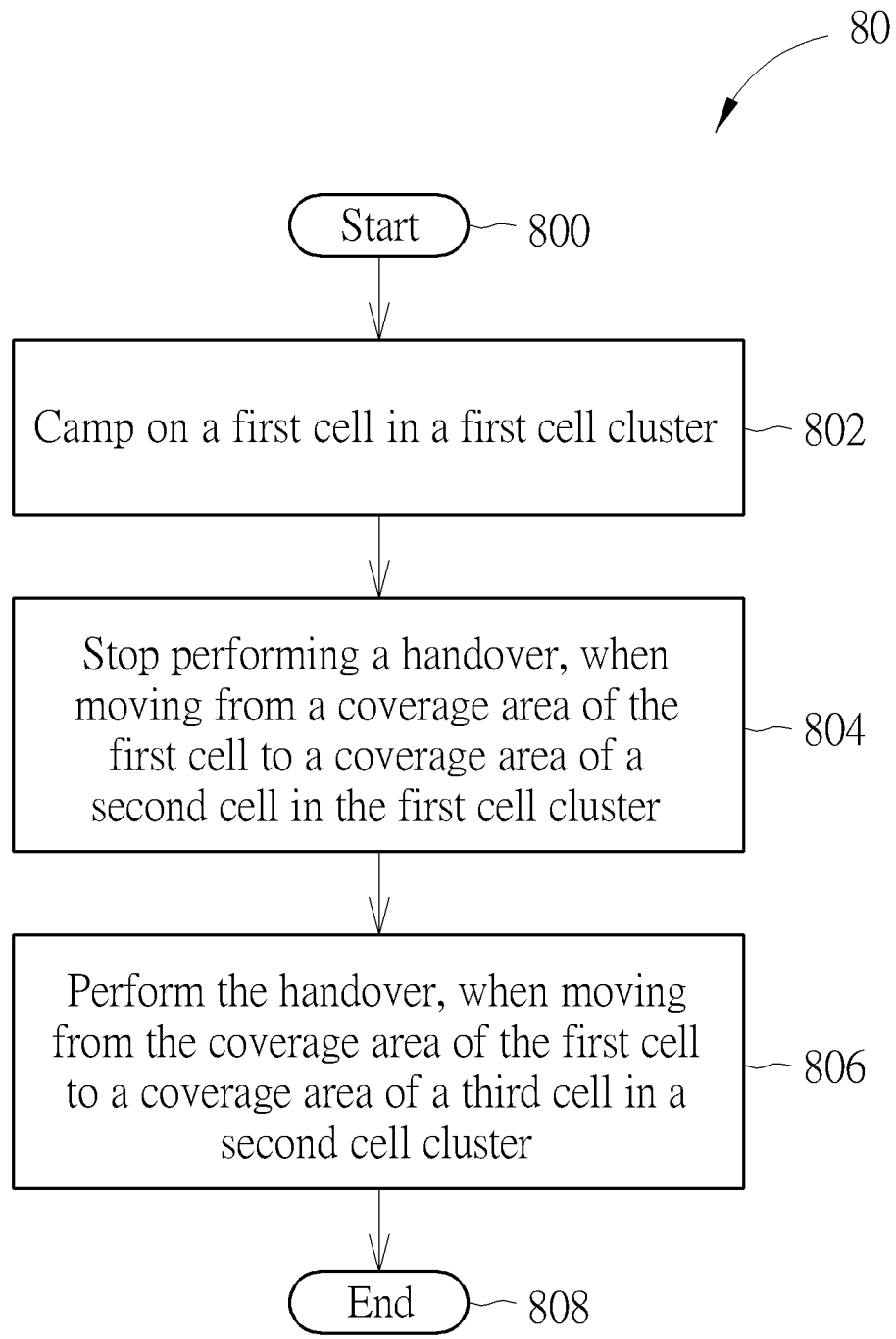
FIG. 8 is a flowchart of a process according to an example of the present invention.

Please refer to FIG. 8, which is a flowchart of a process 80 according to an example of the present invention. The process 80 can be utilized in the communication device 100 shown in FIG. 1, for handling a network entry. The process 80 may be compiled into the program code 214 and includes the following steps:

Step 800: Start.

Step 802: Camp on a first cell in a first cell cluster.

Step 804: Stop performing a handover, when moving from a coverage area of the first cell to a coverage area of a second cell in the first cell cluster.

Step 806: Perform the handover, when moving from the coverage area of the first cell to a coverage area of a third cell in a second cell cluster.

Step 808: End.

According to the process 80, the communication device has camped on a first cell in a first cell cluster. Then, the communication device stops performing a handover, when moving from a coverage area of the first cell to a coverage area of a second cell in the first cell cluster. In addition, the communication device performs the handover, when moving from the coverage area of the first cell to a coverage area of a third cell in a second cell cluster. In other words, the communication device does not perform the handover when the communication device moves to a different cell in the same cell cluster, but performs the handover when the communication device moves to a different cell in a different cell cluster. As a result, performance improvement obtained from the cell cluster is not decreased due to frequent handovers.

Taking FIG. 1 as an example, the communication device 100 does not need to perform the handover as long as the communication device 100 is in the coverage area of the cell cluster 120, even if the communication device 100 moves across multiple boundaries of the cells in the cell cluster 120. However, the communication device 100 may still need to perform a handover, when the communication device 100 moves across the coverage area of the cell cluster 120. Note that the coverage area of the cell cluster 120 can be approximately seen as a union of the coverage areas of the cells 122-134. Thus, the communication device 100 is actually in a coverage area of a certain cell in the cell cluster 120, when the communication device 100 is in the coverage area of the cell cluster 120.

Those skilled in the art should readily make combinations, modifications and/or alterations on the abovementioned description and examples. The abovementioned steps of the processes including suggested steps can be realized by means that could be a hardware, a firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include a system on chip (SOC), system in package (SiP), a computer on module (COM), and the communication device 20.

To sum up, the present invention provides a method of handling a network entry in a cell cluster. Thus, a handover will not be triggered by a cell or a communication device, when the communication device moves across a boundary between two cells in the cell cluster. As a result, performance improvement obtained from the cell cluster is not decreased due to frequent handovers.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling a network entry for a communication device in a wireless communication system, the method comprising the steps of:

receiving a first system information transmitted by a cell in a cell cluster of the wireless communication system;

determining an anchor cell in the cell cluster according to the first system information; and performing the network entry with the determined anchor cell by receiving control information transmitted by the determined anchor cell, to camp on the determined anchor cell, wherein the network entry comprises a random access procedure;

wherein the cell cluster operates at a carrier frequency;

wherein the first system information comprises a cell identity (ID), and the cell ID is for determining the anchor cell;

wherein at least one of a primary synchronization signal (PSS), a secondary synchronization signal (SSS), a common reference signal (CRS), a second system information and a paging information is not transmitted by a non-anchor cell in the cell cluster, when the at least one of the PSS, the SSS, the CRS, the second system information and the paging information is transmitted by the determined anchor cell;

wherein a first power level for receiving at least one of the second system information and the paging information is different from a second power level for receiving at least one of the PSS, the SSS and the CRS.

2. The method of claim 1, wherein the control information comprises the at least one of the PSS, the SSS, the CRS, the second system information and the paging information.

3. The method of claim 1, wherein the control information is transmitted by the non-anchor cell in the cell cluster.

* * * * *